Figure 3:
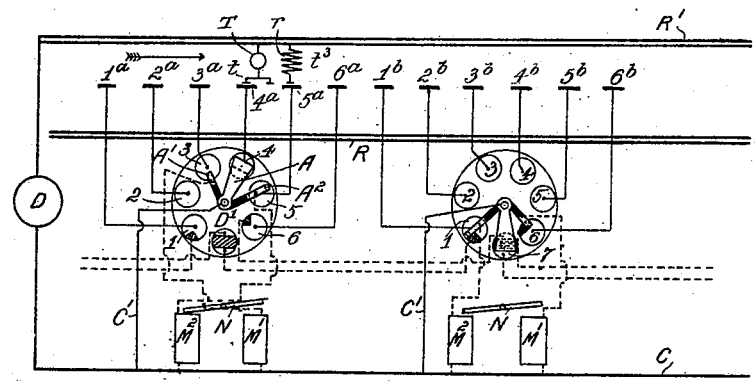

(No Model.)    6 Sheets—Sheet 1.
P. J. PRINGLE.
SUPPLY SYSTEM FOR ELECTRIC RAILWAYS.
No. 602,142.    Patented Apr. 12, 1898.
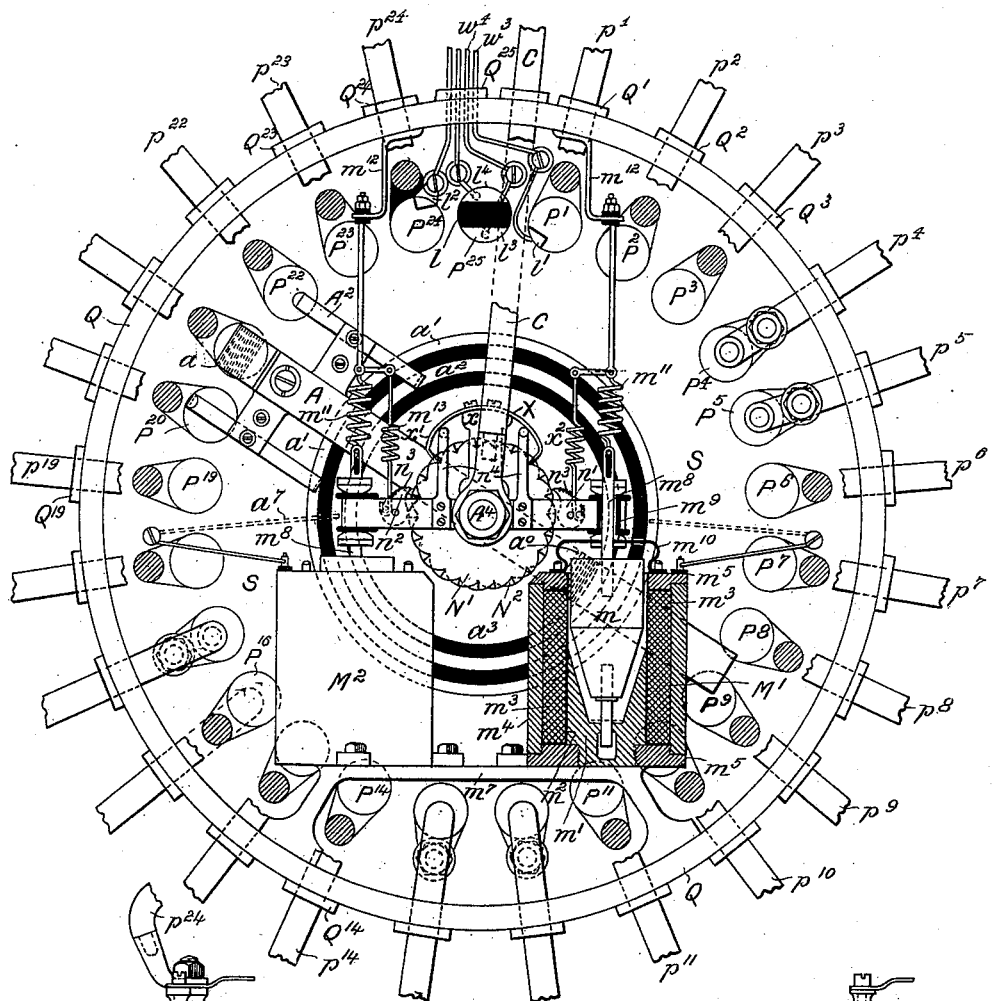
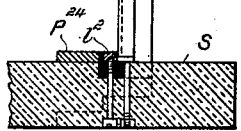
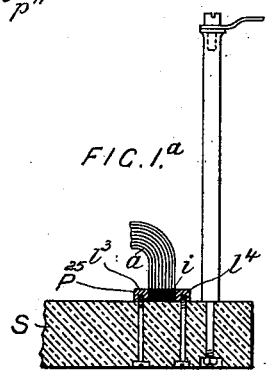
Witnesses
Ho. van Dedemneel
E. A. Scott
Inventor
Percival John Pringle
by Richard S.
Attys

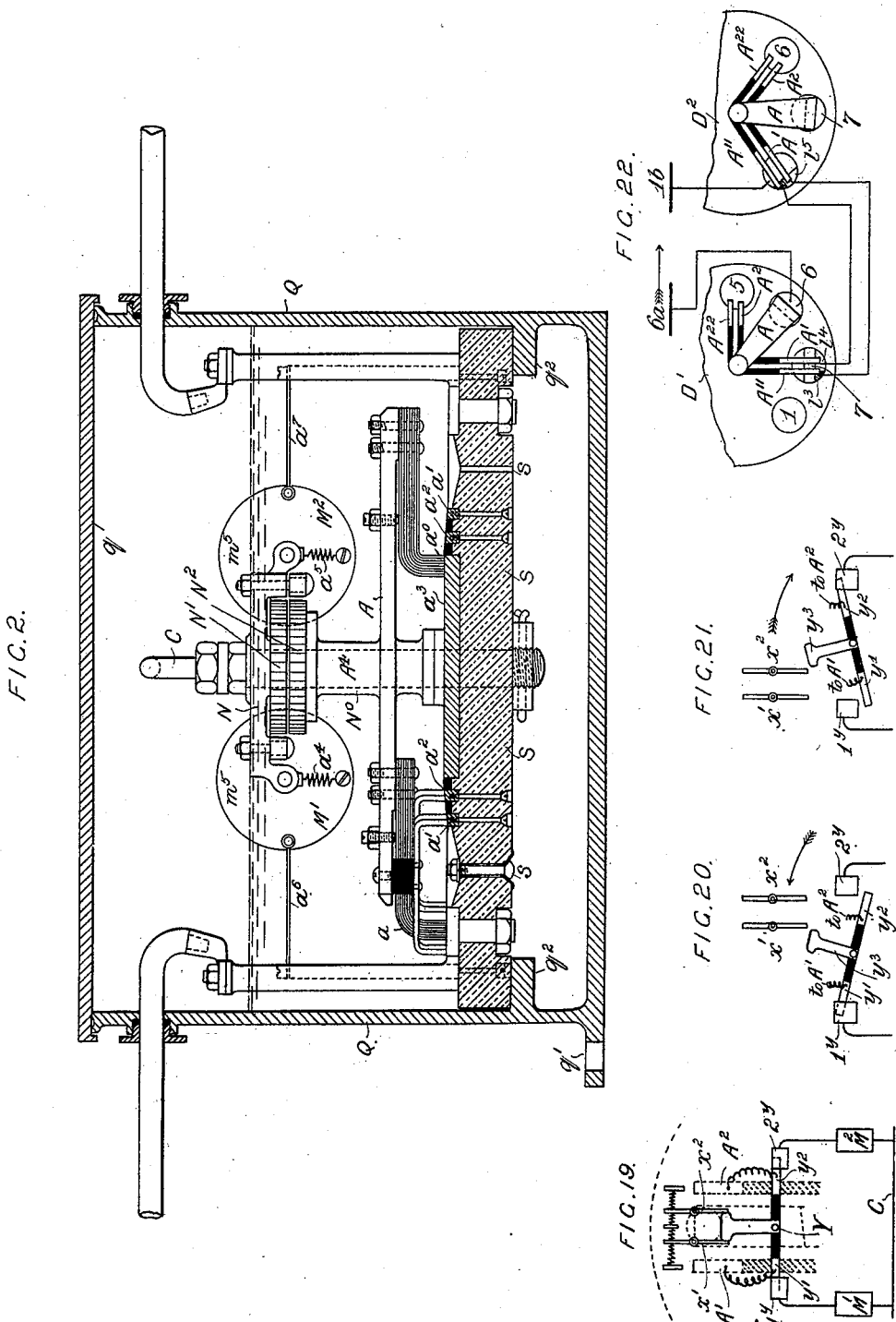

(No Model.) 6 Sheets—Sheet 3.

P. J. PRINGLE.
SUPPLY SYSTEM FOR ELECTRIC RAILWAYS.

No. 602,142. Patented Apr. 12, 1898.

Witnesses
H. van Dedenroel
E. A. Scott

Inventor.
Percival John Pringle
by Richardson
Attys.

(No Model.) 6 Sheets—Sheet 4.
P. J. PRINGLE.
SUPPLY SYSTEM FOR ELECTRIC RAILWAYS.
No. 602,142. Patented Apr. 12, 1898.
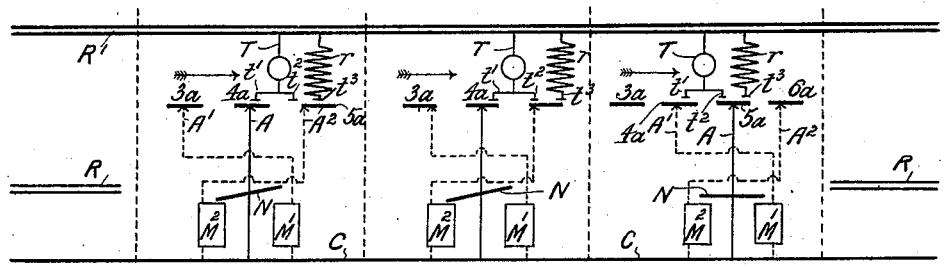
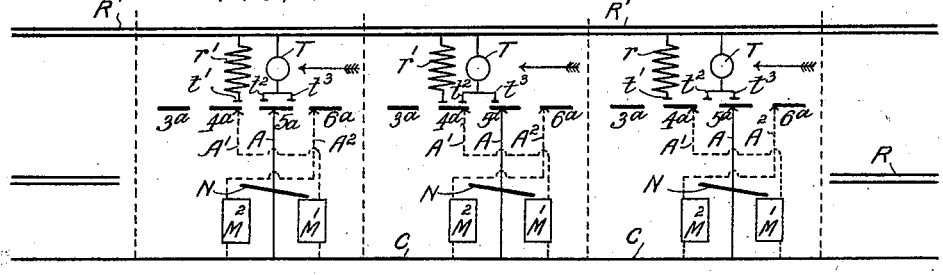
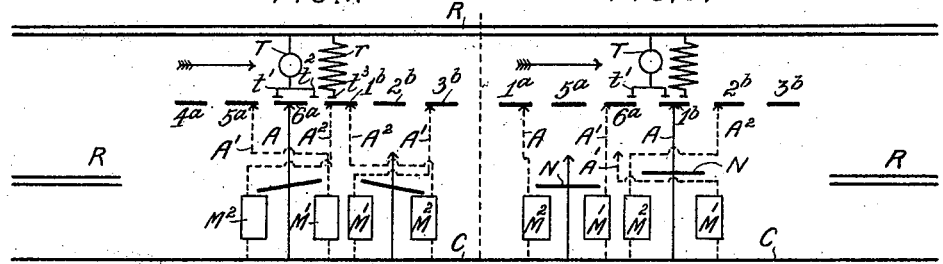
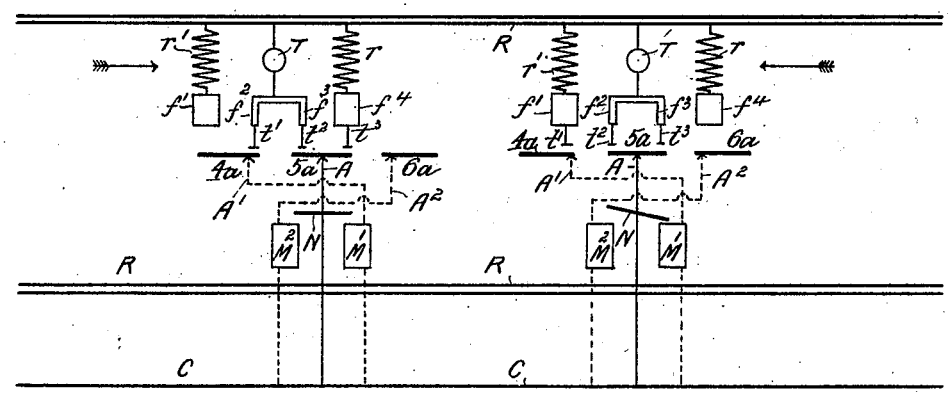

(No Model.)  6 Sheets—Sheet 5.
P. J. PRINGLE.
SUPPLY SYSTEM FOR ELECTRIC RAILWAYS.
No. 602,142. Patented Apr. 12, 1898.
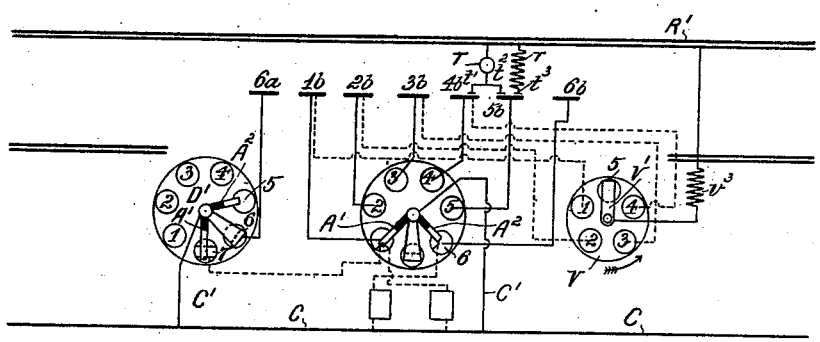
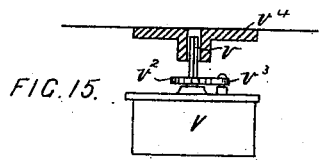
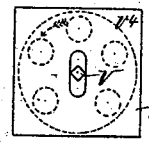
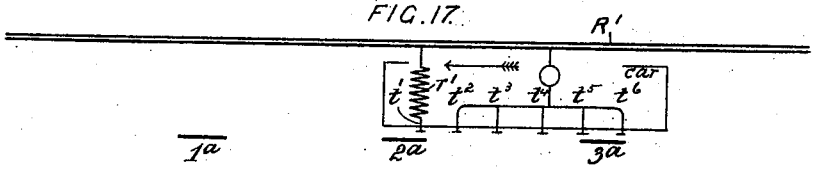
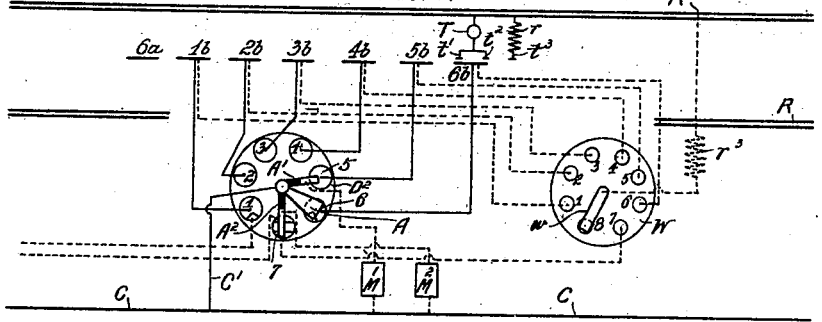
Witnesses
H. van Oldenneel
E. A. Scott
Inventor
Percival John Pringle
by Richardson
Atty (No Model.) 6 Sheets—Sheet 6.
P. J. PRINGLE.
SUPPLY SYSTEM FOR ELECTRIC RAILWAYS.
No. 602,142. Patented Apr. 12, 1898.
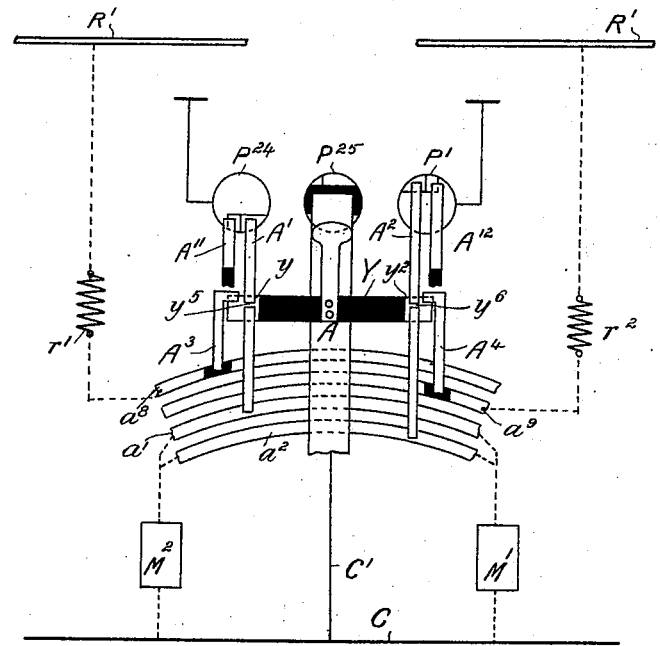
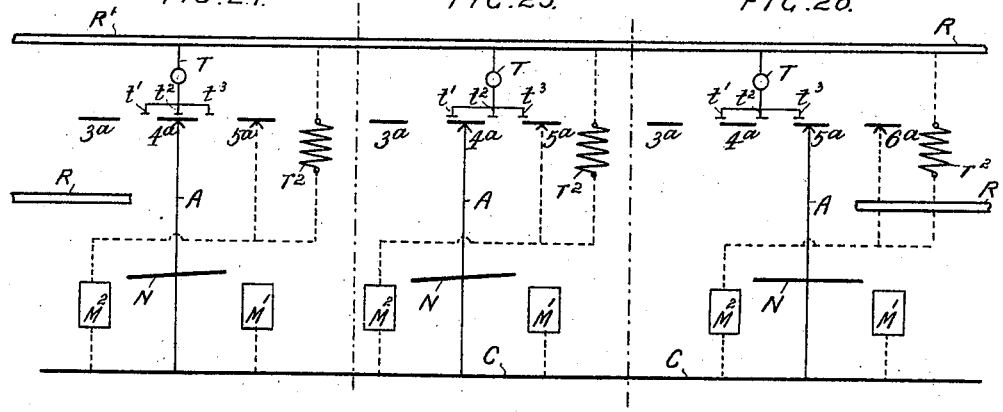
Witnesses
H. van Oldenneel
E. A. Scott
Inventor
Percival John Pringle
Richardson
Attys
THE NORRIS PETERS CO., PHOTO-LITHO., WASHINGTON, D. C.

UNITED STATES PATENT OFFICE.

PERCIVAL J. PRINGLE, OF LONDON, ENGLAND, ASSIGNOR OF ONE-HALF TO JULIAN MONEY VERNON MONEY-KENT, OF SAME PLACE.

SUPPLY SYSTEM FOR ELECTRIC RAILWAYS.

SPECIFICATION forming part of Letters Patent No. 602,142, dated April 12, 1898.

Application filed October 27, 1896. Serial No. 610,210. (No model.) Patented in England February 2, 1894, No. 2,274.

*To all whom it may concern:*

Be it known that I, PERCIVAL JOHN PRINGLE, a subject of the Queen of Great Britain and Ireland, and a resident of Morningside, 5 High View Road, Sidcup, London, in the county of Kent, England, have invented certain new and useful Improvements in the Method of Supplying Electricity to Electrically-Propelled Tram-Cars and other Vehicles and in Apparatus Therefor, (for which I have obtained a patent in Great Britain, No. 2,274, bearing date February 2, 1894,) of which the following is a specification.

My invention relates to an improved method of and apparatus for transmitting from a central station or other supply electrical energy to an electric motor carried by the vehicle to be propelled.

In my system I employ a number of short lengths of metallic conductor which I call "sections," laid on the surface of the road, as hereinafter explained, preferably between the two ordinary running-rails, and I use suitable collecting-brushes attached to the car for transmitting electrical energy from the said sections to the motor on the car, and the return-circuit may be completed through the wheels and rails or otherwise back to the supply. I am aware that sectional conductors and car collecting-brushes have been used in various forms, and hence I lay no claim to them.

The chief objects of my present improvements are to reduce the first cost of equipping a line and the number of contacts and moving parts, so as to be able to augment the reliability of the system, and to diminish leakage of current as much as possible and to obtain sundry other advantages.

My system is adaptable to lines on which cars run in one direction only, to single lines on which cars run in both directions, to crossings, loops, and branch lines for same, and, in fact, to all running systems and any required depot and terminal arrangements.

According to my invention I use for any number of separate surface conductors or sections which are grouped together into one "block" one magnetic device, which I call the "distributer," and this may be placed underground or in any convenient situation. The main insulated cable from the source of supply is also underground and connected to each distributer of the system. Each distributer is connected by separate conductors or "feeders" to every section of a block and controls same, and as the car advances along the tramway each separate section is consecutively and automatically electrically connected to and disconnected from the main conductor, the disconnection from any one section not occurring until the section next in advance has been placed in electrical connection with the main conductor, so that, except momentarily, one section only supplies current to the car-motor at one time, and this is accomplished by the distributer above mentioned and hereinafter fully described. The said feeders from distributers to sections are led and electrically connected one to each section in any convenient manner. As above stated, the sections are laid intermittently between the running-rails, and each car is fitted with a proper number of collectors suitably spaced apart. The collector which at any time is the leading collector is usually connected to the rails or other return-circuit through a comparatively high resistance and acts as a shunt-collector, and the other collectors are coupled together and connected to the motor on the car by suitable switch and regulating gear, or all the collectors on the car may be main collectors and a stationary resistance be provided for each block of sections. It is essential that there be a space between the leading and second following collector of such length that when the car is traveling at maximum speed the time elapsing between the contact of the leading collector and that of the second with any one section shall admit of the distributer hereinafter described to fully act. The coupled collectors are made of such width as to insure continuity of contact during advance of the car between one or more of said collectors and the successive sections.

My invention also comprises means for economically distributing current through the distributer to the sections and blocks in such manner as to meet every contingency of the working of tram-lines.

I will describe my invention in reference to the accompanying drawings and diagrams, of which—

Figure 14:
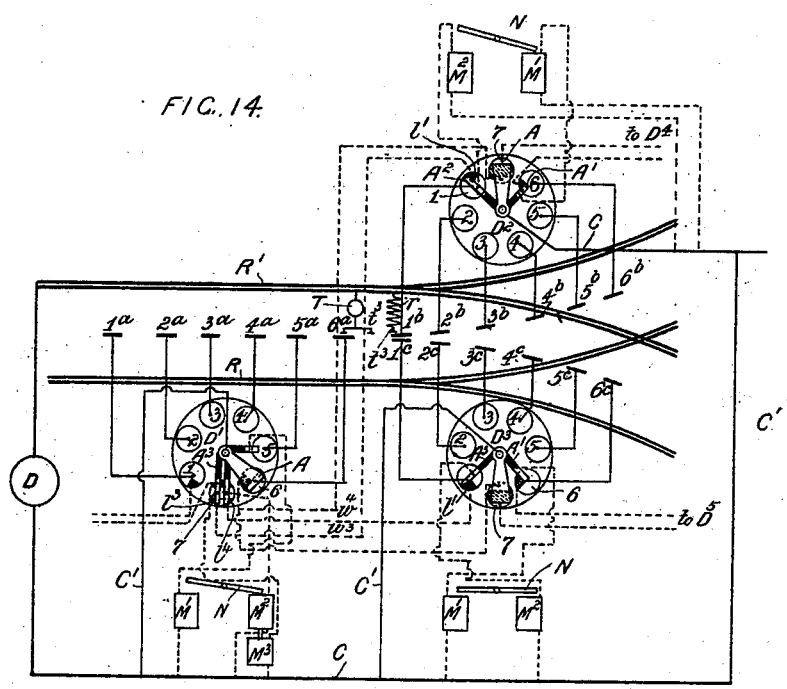

Figure 1 is a sectional plan of a reversing-distributer. Figs. 1$^a$ and 1$^b$ are details of distributer hereinafter referred to. Fig. 2 is a vertical sectional elevation of a reversing-distributer with certain parts removed. Fig. 3 is a diagram showing the arrangement of connections for two blocks controlled by two reversing-distributers. Figs. 4, 5, and 6 are diagrammatic views showing cycle of connections and feed of current to motor on car passing from one section to another. Figs. 7 and 8 are diagrams showing electric connections and feed of current which ensue as the car passes from one block of sections to another. Figs. 9 and 10 are diagrams illustrating the operation of a switch provided for reversing the car when required. Figs. 11, 12, and 13 are diagrams showing the electric connections which ensue on a car being brought to rest and restarted in an opposite direction. Fig. 14 is a diagram showing the arrangement of distributers and connections for a branch from a single line adapted for cars running in both directions. Figs. 15 and 15$^a$ are respectively an elevation and plan of a switch for the purpose of actuating the distributer independently of the movement of the car. Fig. 16 is a diagram illustrating the application of the switch shown in Figs. 15 and 15$^a$. Fig. 17 is a diagram showing a car with five main collecting-brushes and one shunt-brush. Fig. 18 is a diagram illustrating the arrangement of connection and switch for grouping cars close together when required. Figs. 19, 20, and 21 illustrate arrangement for automatically disconnecting the shunt-arm of distributer which is connected with rear section adjoining the one supplying current. Fig. 22 is a diagram illustrating the means employed for electrically disconnecting terminal sections of a block until covered by a car. Fig. 23 is a view illustrating an arrangement for the use of a stationary resistance permanently connected to distributer and return-rail. Figs. 24, 25, and 26 are diagrammatic views illustrating a cycle of connections and feed of current to car when the arrangement shown in Fig. 23 is employed.

The distributer illustrated in the drawings is arranged for a single line on which the cars run in both directions. This I call a "reversing-distributer," and it consists of a central rotary arm A, mounted upon a vertical spindle A$^4$ and connected to the main insulated conductor C. The spindle A$^4$ is mounted upon a bed S, of slate, marble, or other non-conducting substance, as shown, which may be provided with drain-holes $s$ $s$, as shown, plugged or open, for the purpose of draining off any condensed moisture. One end of arm A carries a laminated adjustable contact-brush $a$, working over a series of contact-pieces P' P$^2$ P$^3$ to P$^{24}$, insulated from one another and severally connected by feeders $p'$ $p^2$ $p^3$ to $p^{24}$, respectively, to the several sections 1$^a$ 2$^a$ 3$^a$ to 24$^a$ of any block. Each contact-piece has a vertical rod in electrical connection, to the top of which the respective feeder is connected, as shown in Figs. 1$^b$ and 2. These rods are for the purpose of raising the feeders above the level of the oil contained in the casing hereinafter described, so as not to injure their insulation. There is also one insulated contact P$^{25}$, consisting of a strip of insulation $i$, dividing the two contact-pieces $l^3$ and $l^4$. This is illustrated separately in Fig. 1$^a$, and upon this insulation $i$ the brush $a$ of the main arm A rests when the distributer is not supplying current to any car. From the top of the rods connected to these contacts $l^3$ and $l^4$ shunt-wires are taken, as hereinafter described. Any desired number of contact-pieces may be used; but in the figure twenty-four (which I consider a convenient number) are shown and so marked in addition to the abovesaid insulated contact-piece P$^{25}$. The other end of the rotary arm A carries a laminated adjustable contact-brush $a^0$, working over a plate $a^3$ in electrical connection with the vertical spindle A$^4$, and concentrically arranged outside this are (in a reversing-distributer) two contact-rings $a'$ $a^2$, upon which work, respectively, the inner ends of two smaller insulated arms A' A$^2$ on each side of and connected rigidly to the main arm A and which make connection with the contact-piece adjacent to whichever one the brush $a$ of the main arm A may be in connection at any time. In a distributer for lines with cars running in one direction only the direction of rotation of arm A would be constant, and hence only one arm A', one ring $a'$, and the two shunt-contacts $l'$ and $l^2$, with their respective shunt-wires, are required. In the reversing-distributer now under description each of the smaller arms A' A$^2$ is connected through the rings $a'$ $a^2$, by leads $a^6$ $a^7$, to the insulated main C through the coils (of a comparatively high resistance) of the magnets M' M$^2$, respectively, the other ends of the magnet-coils $a^4$ and $a^5$ being electrically connected to the vertical spindle A$^4$ in connection, as explained, with the main conductor C. These magnets are constructed as shown best in the sectional view to the right of Fig. 1 and are of a known form which gives a fairly constant pull over a short distance, and are therefore particularly adapted for working this distributer. They consist, preferably, of a divided core $m$ $m'$, the moving part or armature $m$ being of truncated-cone shape, and the fixed part $m'$ being formed to receive same. These cores are placed in a brass cylinder $m^2$, upon which are wound the coils $m^3$. The whole is surrounded by a wrought-iron case $m^4$, with end pieces $m^5$, and both magnets are fixed to a bracket $m^7$, attached to the casing and clear of the vertical contact-rods P' P$^2$ P$^3$, &c. The moving part $m$ has a rod $m^8$ passing through a gland or through a flexible cover or shield, such as $m^{10}$, which serves to prevent oil entering the magnets and damping their motion. The rods $m^8$ of each magnet $M'$ $M^2$ are coupled together by an oscillating bar N, mounted upon spindle $A^4$ and thoroughly insulated from the rods $m^8$ by the ebonite collars $m^9$. It is by the magnetic oscillation of the bar N that the arm A is moved as and when required, and the required motion is derived from the alternate actions of the two magnets $M'$ $M^2$ in any convenient manner. According to the arrangement illustrated the bar N is free to oscillate on the vertical spindle $A^4$, and a sleeve $N^0$ is provided, and this sleeve carries the main arm A, and at a suitable level and rigidly fixed to the sleeve I mount a pair of reversed ratchet-wheels $N'$ $N^2$, each having the same number of teeth as the number of contact-points $P'$ $P^2$ $P^3$ to $P^{25}$ in any distributer, and the edges of such teeth being in line with one another. On the bar N and at diametrically opposite points of the ratchets $N'$ $N^2$ are mounted two pawls $n'$ $n^2$, adapted to engage the ratchet-teeth respectively, and a spring locking device X, having two arms $x'$ $x^2$, is provided. It is mounted upon a fixed part $x$ and adapted to engage the ratchet-teeth when the arm A is at rest upon a contact. The device is operated by projections $n^4$ on the bar N, as shown, or other part moving with the magnet-rods $m^8$. The magnet-rods $m^8$ are each connected by springs $m^{11}$ to fixed insulated points, such as $m^{12}$, from which or from any convenient part adjacent thereto spring connections $m^{13}$ are arranged to act on the pawls $n'$ $n^2$. $n^3$ are return-springs for the said pawls.

Thus the magnets through the reversed ratchets and pawls described act in opposing directions, one working the switch-arm A clockwise and the other counter-clockwise, since when one magnet—say $M'$—is excited its armature $m$ is attracted against the opposing force of the spring $m^{11}$, which is thereby extended, as also is pawl-spring $m^{13}$, thereby throwing the pawl $n'$ into engagement with the next tooth of the ratchet $N'$. At the same time the projection $n^4$ presses against and disengages the arm $x'$ of locking-catch $X'$ from the ratchet, and when the same magnet is demagnetized the power stored up in said spring $m^{11}$ causes the pawl $n'$ to revolve the ratchet $N'$ and move same for a distance of one tooth, further movement at one operation being prevented by the spring-catch $X'$ reëngaging the next tooth of the ratchet $N'$ as soon as the bar N is released, and at the same time the arms A $A'$ $A^2$ are moved onto the next succeeding contact-pieces, the acting pawl $n'$ being then disengaged from its ratchet by means of its return-spring $n^3$. The separately-insulated contacts $l'$ $l^2$, respectively, of contact-pieces $P'$ $P^{24}$ and $l^3$ $l^4$ of contact-piece 25 and their respective purposes are hereinafter explained.

The whole of the above-described mechanism is securely fixed in a casing or box Q of suitable form and size, with lid $q$ grooved for packing and all adapted to be made oil and water tight.

The case is provided with suitable lugs $q'$ for bolting down and $q^2$ for supporting the base-plate S and with bosses and glands $Q'$ $Q^2$ $Q^3$ to $Q^{25}$ for all conductors opposite every internal contact-piece. It is constructed in the known manner and of a form substantially such as is illustrated. This casing is filled with a suitable oil to about the level shown, and by this means thoroughly efficient lubrication of all the working parts of the distributer is insured with the object of reducing wear and tear, and condensation of moisture is prevented, and thus better insulation is maintained.

I will now describe, with the aid of the drawings attached, the working, first, of a single line with cars running in both directions, in which case a reversing-distributer such as is above described is required.

Fig. 3 shows the arrangement of connections for two reversing-distributers $D'$ $D^2$.

R $R'$ represent the running-rails, $R'$ being the return; C, the main conductor; $C'$, the leads from conductor to distributers, and D the dynamo or source of supply.

$1^a$ $2^a$ $3^a$ $4^a$ $5^a$ $6^a$ represent the several successive sections of one block controlled by one distributer $D'$, and $1^b$ $2^b$ $3^b$ $4^b$ $5^b$ $6^b$ those of another block controlled by the distributer $D^2$. For the sake of simplicity each distributer is here shown with six contact-pieces only, which are so marked.

A is the main arm, and $A'$ $A^2$ the smaller arms, all connected as above set forth in describing the distributer.

T represents the motor carried on the car, and $t'$ $t^2$ two collecting-brushes adapted to make rubbing contact with the several sections over which they pass and so supply the current to the car.

$t^3$ is the shunt-brush, connected through a resistance $r$, as above stated, to the return-rail $R'$. The current is supplied to the car at $4^a$, and the shunt-brush is on $5^a$. Therefore the magnet $M^2$ is magnetized, attracting the vibratory bar N, as shown. These connections are also shown in Fig. 4. As the car advances in direction of the arrow the brush $t^2$ comes on section $5^a$, as at Fig. 5, at the same time that the shunt-brush $t^3$ is on the same section $5^a$, this short-circuits magnet $M^2$, causing bar N to be pulled back to normal position by its spring and simultaneously causing arms A $A'$ $A^2$ to move a distance of one contact each, as shown on Fig. 6. It will be noticed that the circuit is never broken either on the distributer or on the sections.

The electric connections which ensue as the car passes from the block controlled by distributer $D'$ into block controlled by the distributer $D^2$ are shown diagrammatically in Figs. 7 and 8, the car being presumed to have advanced until its brushes $t'$ $t^2$ are receiving current from section $6^a$, when its shunt-brush $t^3$ will have just made connection with section $1^b$. A similar action occurs to that described in reference to Fig. 4; but since the magnets M' of each of the distributers D' D² are in parallel both will be magnetized, attracting bars N of both distributers D' and D², and the car advances until brush $t^2$ makes contact with section $1^b$, which will then short-circuit magnet M' of both distributers D' D². This will cause the bar N of distributer D' to be drawn back by its spring into normal position, again moving forward the three arms A A' A² one contact each into the positions shown at Fig. 8. The main arm A of distributer D' has now advanced and lies upon the insulated contact 7, and the current is therefore cut off from section $6^a$. The distributer D' is therefore in a position to feed current to a car entering on section $1^a$ or $6^a$. On bar N of distributer D² being drawn back into its normal position by its spring it will move arms A, A', and A² one contact forward, as also shown in Fig. 8. It will now be seen that main arm A of distributer D² is feeding current to the car through the collecting-brush $t^2$ to motor T. On the car advancing until the shunt-brush $t^3$ is on section $2^b$ the same action will be repeated as has been described in reference to Figs. 4, 5, and 6.

In order to reverse the car, when required, I provide a switch constructed as indicated in Figs. 9 and 10. The switch has four contacts (marked $f'$ $f^2$ $f^3$ $f^4$) arranged to work over three contacts connected to the car-brushes $t'$ $t^2$ $t^3$. In addition to the resistance $r$, which has been shown up to this point as connected to the leading-brush $t^3$, thereby making same into a shunt-brush, I employ another similar resistance $r'$, adapted to be coupled to the rear brush $t'$, thereby making it into the shunt-brush. At the same time $r$ is to be disconnected from brush $t^3$ (and $t^2$ and $t^3$ become the main collectors to motor) by being connected directly to the contacts $f^2$ and $f^3$. This switch is diagrammatically shown in Fig. 9, which represents the car stopped in the same position as is shown in Fig. 6.

Suppose now that a car which has been traveling in the direction of the arrow to be at rest, as shown in Fig. 9. On reversing this switch, as shown in Fig. 10, and then reversing the main current to motor brush $t'$ would then become a shunt-brush, in this case causing the magnet M' to be magnetized, and $t^2$ $t^3$ would become main collecting-brushes, the connections being as shown in Fig. 11. The car would then travel in the opposite direction, and a brush $t^2$, making contact with section $4^a$, as shown at Fig. 12, M' would be short-circuited and so actuate the distributer in the same manner as previously described and as will be readily understood.

In circuit with the motor between contacts $f^2$ and $f^3$ and return-rail R' is arranged the usual equipment of a motor consisting of adjustable and reversing switches and a separate main switch for breaking the main current to the car-motor, and it is necessary for this last-mentioned switch to be opened before the switch for reversing the brush connections is operated, because if the shunt-brush $t^3$ (see Fig. 9) were alone in contact with the section $6^a$ (and so magnetizing magnet M²) the breaking of the connection of $f^4$ with the contact connected to $t^3$ (which would be equivalent in its action to short-circuiting M²) would cause the main arm A of distributer to be moved on one contact ahead, (independently of the car,) when it might be supplying some main current, the breaking of which would not be advisable inside the distributer.

Should the car be reversed when in the position shown at Fig. 4, on breaking the shunt resistance $r$ the magnet M² is demagnetized, and then, as above described, the arms A, A', and A² are moved one contact into the positions shown in Fig. 13 and the car would be supplied with current from section $5^a$. As already explained, each distributer controls a certain number of sections composing a block, and the length of the block decides the minimum distance the cars may follow one another. Should a car gain on the preceding one and run into its block, the supply of current would be immediately cut off same and remain so until the block was open, thus insuring safety and regulation of the traffic. In busy parts of the line it is evident the blocks may be composed of fewer sections.

I will now describe the means I adopt for the purpose of switching current onto the motor of a car which has run into a block at the time containing a car, but the block being since cleared. This is effected by the use of a separate switch, as shown at Figs. 15 and $15^a$. It is generally required to arrange only for switching current onto the car when it has stopped in the earlier sections of any block, say from $1^b$ to $4^b$, inclusive, Fig. 16. In this case I use a separate switch V, adapted to perform the same functions as the car moving over the same sections, and in the case assumed the switch has five contacts, Nos. 1, 2, 3, and 4 being connected by shunt-wires, as shown dotted, to sections $1^b$, $2^b$, $3^b$, and $4^b$, respectively, and No. 5, which is an insulated contact. They are all arranged circularly around a base of slate or marble, and over them a rotating arm V' moves, but which is not in contact with same until it is depressed against the opposing action of a spring. The arm V is permanently connected to the return-rail R' through a resistance $r^3$ approximately equivalent to one of the aforesaid resistances $r$ $r'$ on the car. This switch is fixed in a water-tight iron case placed underground and with a key-shaft $v$ $v$ coming up through same and so that the arm V' can be rotated over the contact-pieces; but this arm V' is not in contact with same until the key-shaft to which it is attached is depressed by means of a key carried by the driver. A ratchet-wheel $v^2$ is feather-keyed to shaft $v$, and a pawl $v^3$ is adapted to engage with same, so that it can only be turned in the direction as shown by arrow, and a key-plate $v^4$ is fixed on surface of road and so arranged that it is only possible to insert and withdraw key when the said arm V' is on the insulated stop 5. In practice if the car has stopped in position shown in Fig. 16 the driver will insert his key, depressing same, and slowly revolve arm V', making contact first with $1^v$ and causing a shunt-current to then flow through magnet M' of main distributer $D^2$. On the arm V' of switch V leaving contact No. 1 this magnet would become demagnetized, moving arms A, A', and $A^2$ of distributer $D^2$ one contact in advance and bringing its main arm A onto contact No. 1. On arm $A^3$ making and breaking contact with $2^v$, $3^v$, and $4^v$ similar actions would successively occur, and it would then be found that the main arm of $D^2$ had moved onto contact No. 4 and was therefore in a position to supply current to the car. It is necessary that arm V' of switch V should not bridge across any two contacts and that it should be arranged that the time taken between making and breaking contact with any one contact or breaking and making between any two should be sufficient to enable the distributer to work.

In the description of my invention and in the diagrams referred to up till the present two collecting-brushes only and one shunt-brush have been shown attached to the car; but I may use a larger or any desirable number, and thereby shorten the sections and so reduce leakage of current from these when they are thrown into connection with the main conductor and also the number required per mile of the line, or I may omit the resistance attached to the shunt-collector of the car, which collector would then be connected unparallel with the other collectors and become a main current-collector. This arrangement is hereinafter more fully described. For example, in Fig. 17 I show a car with five main collecting-brushes $t^2$ to $t^6$ and one shunt-brush $t'$.

The brushes at each end of the car are so arranged that the base of the car beyond them will completely cover the whole length of a section before making contact with same, so that a section which is directly connected to the main supply is in no case exposed. The brushes are so spaced apart that continuity of contact is always maintained between one or other of them and the sections as the car advances.

In the case of a one-direction distributer with one shunt-arm, as described, if it is desired that the section connected to the main, through the shunt-arm and its respective magnet, and which is always in advance of that section supplying current to the car, should always be covered by the base of the car, this can be accomplished by bringing the sections close together and spacing the brushes on the car accordingly. In the case of a reversing-distributer with two shunt-arms, as already described, the sections adjoining that section supplying current to the car are always connected to the insulated main conductor through their respective shunt-arms and magnets. If it is desired that these sections should also be covered by the base of the car, this can be accomplished in a similar manner by bringing the sections closer together; or I may, to partly save this increased number of sections, (required by placing them closer together,) adopt the following arrangement: To mechanically disconnect the shunt-arm in connection with the contact connected to the rear section adjoining the one supplying current from its respective magnet and so prevent this rear section being in any connection with the main conductor, it is then only necessary to so space the sections that the one supplying current to the car and the section in advance of same are always covered by the base of the car both when at rest and in motion. I have illustrated one such arrangement in Figs. 19 and 21, where Y is a T-shaped arm pivoted at $y$ with two of its arms $y'$ and $y^2$ insulated from one another and electrically connected, respectively, with the shunt-arms A' $A^2$ of distributer. This rocking arm Y is pivoted upon the distributer-arm A, but insulated therefrom. When, therefore, the arm A is on the insulated contact 7, these arm-pieces $y'$ $y^2$ of the rocking arm Y will be in contact, respectively, with the contacts $1^y$ $2^y$, connected to magnets M' and $M^2$, as shown. On the distributer-arms moving counter-clockwise a spring-catch, such as $x'$, pivoted to some fixed part, is arranged to engage the arm-piece $y^3$ and tilt over the arm Y into the position shown at Fig. 20 and so disconnect the rear shunt-brush from its respective magnet. On the arm Y, tilted as in Fig. 20, being rotated by the distributer-arms the arm-piece $y^3$ meets the pivoted spring catch-piece $x^2$, tilts and passes same, and is then sprung into its normal position by the stop $x'$ when distributer is not in use, as shown in Fig. 19. If the distributer-arms had been moved in the reverse direction, the rocking arm Y would have assumed the position shown at Fig. 21, disconnecting the then rear brush from its respective magnet. It will be seen that in this case and every case so far described that the first and last sections of a block when a distributer is not in use are both connected to the main conductor through the shunt-arms and magnets of distributer.

I show in Fig. 22 how the first contact of $d^2$, which is connected to the first section $1^b$ of a block, may be connected to contact 7 of D', so that when $D^2$ is not in use its shunt-arm A' has no connection with its respective magnet even when the main arm A of D' has been advanced onto contact 6. For this reason I have added to each arm A' $A^2$ an additional shunt contact-arm $A^{11}$ and $A^{22}$, fixed side by side, but insulated therefrom. I have divided the contact $l^3$ into two parts, $l^3$ and $l^4$, and added the additional contact $l^5$ on No. 1 and the shunt-wire connecting it to $l^3$. Thus when arm A comes onto contact 6 $A^{11}$ connects $l^3$ $l^4$ and so puts the shunt-arm of A' of $D^2$ in connection with contact I of $D^2$, and when this occurs (with sections arranged for the one-direction distributer, as above described, and with the device described in reference-figures 19, 20, and 21) at no time are the main supply-sections or any sections which are connected to the main conductor through the comparatively high resistance-magnets exposed beyond the ends of the cars. When distributer D' is not in use, there would be similar contacts and connections between contact 6 of D' and contact 7 of $D^2$.

The arrangement for a branch from a single line adapted for cars running in both directions is shown at Fig. 14, where distributer D' controls the sections $1^a$ to $6^a$ and the two distributers $D^2$ and $D^3$ control the sections $1^b$ to $6^b$ and $1^c$ to $6^c$, respectively, of the branch lines. $D^2$ and $D^3$ distributers and their connections are similar to those shown in Fig. 3, but D' distributer, which controls the block before the points to the branch, has an additional shunt-arm $A^3$ adjoining the shunt-arm $A^2$, and the contact-piece $P^{25}$, (referred to in Figs. 1 and $1^A$,) instead of being in one piece, ($l^3$, above specified,) is divided into two, as shown at $l^3$ and $l^4$, each part being insulated from the other. When the main arm A is in the position shown in Fig. 14, the two shunt-arms $A^2$ and $A^3$ make contact, respectively, with contacts $l^3$ and $l^4$, and again are respectively connected by shunt-wires $w^3$ $w^4$ to contact $l$ of distributer $D^2$ and $l'$ of distributer $D^3$. The shunt-arms $A^2$ and $A^3$ of distributer D' are connected to main insulated conductor C through the two magnets $M^2$ and $M^3$, respectively. The two moving armatures of these magnets are coupled together, so that either of them being magnetized would pull down the rocking bar N. In practice this would be more conveniently accomplished by having one magnet with two independent windings. My reason for requiring these two magnets or one magnet with separate windings is hereinafter described.

Now suppose a car is in position as shown in Fig. 14, with shunt-brush $t^3$ on section $1^b$ and the motor receiving current by brushes $t^2$ and $t'$ from section $6^a$. It will be found that magnet $M^3$ of distributer D' and $M^2$ of distributer $D^2$ will become magnetized. As the car advances $t^2$ makes contact with section $1^b$ and short-circuits these magnets, moving the contacts A, A', $A^2$, and $A^3$ of distributer D' forward for one contact in advance, thereby bringing the main arm A onto the insulated contact 7 and moving the arms A, A', and $A^2$ of distributer $D^2$ forward one contact, so as to bring its main arm A in connection with contact-piece I and so supply current to section $1^b$. Taking the case of the car running into section $1^c$ of the other branch, similar connections would be made between distributers D' and $D^3$, but magnet $M^2$ would be actuated instead of $M^3$.

I will now describe the reason why distributer D' requires two magnets $M^3$ and $M^2$ or one magnet with two separate windings. This is because if the two shunt-wires $w^3$ $w^4$ running from contacts $l'$ of $D^3$ and $l$ of $D^2$ were taken to one contact and from thence through one magnet $M^2$ to C instead of two separate contacts $l^3$ and $l^4$, and two magnets on the car being in the position as shown, with the shunt-brush $t^3$ on section $1^b$, it would be found that magnet $M^3$ of distributer D' and magnets $M^2$ of $D^2$ and $D^3$ would all become magnetized; but by separating these contacts I am able to obtain independent working between distributers $D^2$ and $D^3$.

With cars traveling in the opposite direction on either of the branches, when the leading or shunt brush of car makes contact with section $6^a$ distributer D', having its main arm on contact 7, would cause (on whichever branch the car was) through the agency of shunt-arm A' (which would be on contact 6) the magnet M' to become magnetized, and at the same time magnet M' of distributer $D^2$ or $D^3$ (according to which branch car was on) to also become magnetized. As the car advances the magnets would be short-circuited and the distributers actuated, as previously described, when D' would then supply current to the car and either $D^2$ or $D^3$ (according to which had been supplying current to car) would have its main arm A moved onto insulated contact 7. It will be seen, therefore, that the objects of the small contacts $l'$ and $l^2$ of contact-pieces 1 and 6 are the following: Should a car advance so that shunt-brush $t^3$ comes on section $1^c$ when a car is already in the block controlled by distributer $D^3$, the shunt-arm A' of $D^3$, not being in the position shown as connecting across $l'$ and contact 1, would not permit of magnets $M^2$ of distributers D' and $D^3$ being magnetized, so that on the car advancing until its rear brush $t'$ left section $6^a$ the main current supplying the motor would be broken at the section $6^a$ instead of inside distributer D', where it might damage the contacts.

I will now describe one method of grouping the cars close together, as is required at the depots, termini, or at busy junctions or other places.

Referring to Fig. 18, $D^2$ is a distributer controlling six sections $1^b$ to $6^b$, $6^b$ being the terminus of a line. In practice for depot or terminus arrangements it would only be necessary to group the cars on a small number of sections of the block. From each of such sections a shunt-wire is taken to contacts 1, 2, 3, 4, 5, and 6 of the separate switch W, which would be placed in some convenient position near where this grouping is required. A shunt-wire is also taken from contact 7 of distributer $D^2$ to contact 7 on switch W, and there would also be an insulated off contact 8. Over these circularly-arranged contacts the arm $w$ rotates; but this arm does not make connection with any contact until depressed and is connected to the return R' through a shunt-resistance $r^3$, (about equal to the shunt-resistance on the car.)

Now, assuming that a car has entered the block controlled by $D^2$ and run to the terminal section $6^b$ in the position as shown, leaving the main arm A of $D^2$ on contact 6, before another car can enter this block it is necessary that the main arm A should be moved onto the insulated contact 7, and this is done by means of the switch W in this manner: The normal position of the arm $w$ would be on the insulated contact 8, and the driver of the car would revolve this arm (at the same time depressing same) over the contacts in the same direction as the car has traveled over the sections—that would be clockwise as drawn. On this arm $w$ making connection with contacts 1, 2, 3, and 4 nothing would happen, as the arms A, A', and $A^2$ of distributer are not connected to these; but on it making connection with contact 5 it would cause magnet M' of distributer $D^2$ to become magnetized, and on it breaking connection with contact 5 M' would become demagnetized, moving the arms A, A', and $A^2$, so that arm $A^2$ comes on contact 6 of distributer $D^2$. Then on arm $w$ making connection with contact 6 of W, $M^2$ then becomes magnetized, because arm $A^2$ is in connection with contact 6 of distributer $D^2$. On arm $w$ breaking connection with contact 6 of W, $M^2$ becomes demagnetized, moving arms A, A', and $A^2$ on one contact, so that $A^2$ again now comes on contact 7. Should, however, the car collecting-brushes $t'$ and $t^2$ be just in connection with sections $5^b$ and $6^b$ this action just described would not occur, as magnet M' would not become magnetized with the contacts 5 of $D^2$ in connection with contact 6 of $D^2$, which is directly connected to the main insulated conductor C through the main distributer-arm A. In the same manner by arm $w$ making and breaking connection with contact 7 of W the arms A, A', and $A^2$ of distributer $D^2$ are moved so that its main arm A is on insulated contact 7. On the next car running onto section $5^a$ or $4^a$, whichever the case may be, the arm $w$ would again be depressed and rotated by the driver or attendant, with the same actions taking place as afore described, but these actions commencing with contacts 3 or 4 (according to which section the second car has stopped on) of W instead of with contact 5, and so on in like manner for every car. Suppose the last car is on section $3^a$ and it is required to start the cars out of the terminus or depot. The main arm A of $D^2$ would have been returned to the insulated contact 7 by means of the switch-arm $w$ of W having been revolved in connection with the contacts above described after this last car had entered the depot or terminus. Now to start this last car it would be necessary for the driver or attendant to depress and revolve the arm $w$ of W over the contacts in the same direction as before—that is, clockwise—stopping and releasing same on whichever contact is connected to the section on which the main brushes of the last car are, in this case contact 3, and then returning it to the insulated contact 7. This making and breaking contact with the successive contacts would actuate the distributer-arms A, A', and $A^2$ step by step until the arm $A^2$ was on contact 3 of $D^2$, and, $M^2$ being magnetized, the releasing of arm $w$ of W would cause the arms A A' $A^2$ to move one contact, bringing the main arm A onto section $3^b$ ready to supply current to the car. On this car leaving the depot or terminus and proceeding into the next block the main arm A would be returned to the insulated contact 7 of $D^2$, and on the switch W being operated in a similar manner to that just described the arm A would again be moved into the contact in connection with the section on which are the main brushes of the last but one car and would be ready to supply current to same. Each car in succession on leaving the depot or terminus would require similar operations.

I have previously referred to and will now describe means whereby the shunt collector and resistance on the car may be dispensed with and a permanent or stationary resistance or resistances provided for each separate block—that is to say, for one-way lines a single resistance and for two-way lines a pair of resistances for each distributer. The shunt-collector on the car will then be connected in parallel with the other main collectors and become a main collector.

Referring to a two-way line, where a reversing-distributer is used, the two stationary resistances are connected between the distributer and the main conductor, and I have diagrammatically illustrated these connections in Figs. 23, 24, 25, and 26, together with the necessary addition to the distributer mechanism. In this arrangement the rocking switch Y, instead of making a breaking contact between the shunt contact-arms and the two magnets, makes and breaks contact between the shunt contact-arms and the two magnets and the two stationary resistances as well. The shunt contact-arms A' and $A^2$ are divided at $y^5$ and $y^6$, respectively. The two resistances $r'$ and $r^2$, which are connected to the return-conductor R', are taken to two additional contact-rings $a^8$ and $a^9$, and on these rings two additional shunt contact-arms $A^3$ and $A^4$ make contact.

The rings $a^8$ and $a^9$ are cut at $a^{10}$ and $a^{11}$ and a piece of insulation let in, so that when main contact-arm is on contact $P^{25}$ the shunt-arms $A^3$ and $A^4$ are insulated from the resistances; otherwise both magnets would be excited when distributer was out of action. The shunt contact-arm $A^{11}$ and $A^{12}$ and the contact-piece recessed in P' and $P^{24}$ are the same as previously shown in Fig. 22 and are included in the arrangement I am now describing for the same purpose—i. e., for disconnecting the main supply-conductor disconnected through the circuit of the magnets from the terminal sections of a block during the time the distributer is out of action.

The contact-plates $y'$ and $y^2$ of rocking switch Y, according to whether the arm is horizontal or tilted, make contact with either or both of the following set of contacts—viz., when in horizontal positions shown in Fig. 23 with the two halves of shunt contact-arm $A'$ and shunt contact-arm $A^3$, and also the two halves of shunt contact-arms $A^2$ and $A^4$. In this position the arm A is on the insulated contact $P^{25}$, and the two arms $A^3$ and $A^4$ being on the insulated parts $a^{10}$ and $a^{11}$ of rings $a^8$ and $a^9$ both magnets are out of action.

I will now assume the distributer has been operated from the position shown in Fig. 23, so that contact-arm A is on $P^4$. As soon as the main arm A moves from $P^{25}$ to $P'$ rocking arm of switch Y is tilted to position shown in Fig. 21, which causes the shunt-circuit of magnet $M^2$ and resistance $r^2$ to be completed through shunt-arm $A^2$ and $M'$, $r'$, and $A'$ to be each disconnected from one another.

Fig. 24 shows, diagrammatically, the connections which occur in the case taken when the main switch contact-arm is on contact $P^4$, the arrangement of connections being the same as when in contact $P'$ or contact 4 in reference to the distributer, with only six contacts illustrated for simplicity in this and the previous diagrams, and the action of the distributer is as follows: The magnet $M^2$ is excited by a shunt-current passing through resistance $r^2$, the car being supplied with current from section $4^a$, which is connected to contact 4 of distributer. On car advancing to position shown in Fig. 25 $M^2$ is short-circuited, and the main arm of distributer is then moved onto the contact connected with section $5^a$, as shown in Fig. 26. On this movement taking place $M^2$ is again magnetized and the bar N pulled down ready for a similar action to take place. When one distributer is about to be put out of action and another brought into action, the movements and connections are similar to that described in Figs. 7 and 8, but with the same modifications as above described in connection with Figs. 24, 25, and 26.

The advantages of this method of working and the use of a permanent stationary resistance for each block of section are that by suitably adjusting the resistances of $r'$ and $r^2$ with reference to the resistances of their respective magnets $m'$ and $M^2$, the potential at the section immediately in front of the one supplying current to the car can be reduced to such a degree that this potential will in no way interfere with animal or vehicular traffic. The section in advance of the one supplying current to the car need not, therefore, be covered by the base of the car until same has been directly connected with the main supply. This allows of the various sections being spaced much farther apart, correspondingly reducing the number required per mile of track and also the number of distributers. It will readily be seen that this method of connecting up can be adapted to branch lines, as described in Fig. 14, to the method of switching current into a car which had previously run into a block engaged, as described under Fig. 16, and to the grouping of cars, as described under Fig. 18.

Having now described my invention, what I claim as new, and desire to secure by Letters Patent, is—

1. A system of electric traction consisting of the combination of a rail or tramway track forming the return-circuit, an electrically-propelled vehicle on the track having collectors attached which pick up the current from a series of surface plates or rails a certain number of which form a block, and a shunt-collector on the vehicle connected to return-rail through a resistance also carried on vehicle, a main supply-conductor from source of electricity and conductors from distributers to the separate sections of a block, a series of distributers one for each block of sections for successively connecting the current from the main supply to the said separate sections in exact relationship with the movement of the car or vehicle substantially as set forth.

2. In a system of electric traction in which current is fed to the car from a number of separate short conducting-sections, a certain number of such sections forming a block for lines on which cars travel; a current-distributer for each block consisting of a magnet in shunt with the main supply to car and a movable armature connected to and operating a rocking bar provided with return-springs and pawl and ratchet-wheel for automatically actuating a main-current-distributing arm with a shunt-arm arranged to rotate over contact-pieces for successively connecting the main current from the source of supply to the said separate sections and disconnecting same as and when required, and the circuit connections from main supply through distributer to section and car-motor and resistance to return-circuit substantially as set forth.

3. In a system of electric traction in which the current is fed to the car from a number of short conducting-sections a certain number of such sections forming a block for tram-lines on which cars travel in both directions, a reversing-distributer for each block comprising two magnets in shunt with the main supply to car their movable armatures connected to and operating a rocking bar provided with return-springs and pawls and ratchet-wheels for automatically actuating a main-current-distributing arm with two shunt-arms arranged to rotate in both directions over contact-pieces for successively connecting the main current from the source of supply to the said separate sections and disconnecting same as and when required, and the circuit connections from main supply through distributer to sections and car-motor and resistances to return-circuit.

4. A distributer for use in a system of electric traction of the kind above described consisting of the combination of a rotary main supply contact-arm connected with a source of electrical supply, two small contact-arms on each side of main arm but insulated therefrom, two contact-rings on which the former have connection each connected through one of a pair of magnets to the source of supply, said magnets being excited in shunt by means of a collector and resistance carried by a vehicle, a rocking switch permitting only one of the magnets being excited at one time, two movable armatures connected to opposite ends of a rocking bar, springs attached to opposite ends of rocking bar and two pawls together with controlling-springs, two oppositely-cut ratchet-wheels permitting the main arm to be moved one contact at a time in either direction and locking-catches for ratchets and means for operating same, a series of contacts arranged circumferentially, a series of feeder-cables attached to same, standards for feeder-cables, the whole inclosed in a casing provided with bosses and glands for feeder and main cables substantially as set forth.

5. A distributer for use in a system of electric traction of the kind above described consisting of the combination of a main supply contact-arm connected with the source of electrical supply, a shunt contact-arm insulated from main arm, a contact-ring on which the shunt-arm makes contact each connected through an electric magnet to the source of supply, said magnet being excited in shunt by means of a collector and resistance carried by vehicle, the movable armature of magnet connected to a rocking bar, a spring opposed to action of magnet and attached to rocking bar and pawl together with its controlling-springs and a ratchet-wheel permitting the main arm to be moved one contact at a time and locking-catches for ratchet and means for operating same, or series of contacts arranged circumferentially, a series of corresponding feeder-cables attached to same and standards for feeders, the whole inclosed in a casing provided with glands for main and feeder cables substantially as set forth.

6. A system of electric traction consisting of the combination of a rail or tramway-track forming the return-circuit, an electrically-propelled vehicle on the track having collectors attached which pick up the current from a series of surface plates or rails a certain number of which form a block, and a resistance for the block in shunt from the distributer to the return-rail, a main conductor from source of electricity and a series of distributers one for each block of sections for successively connecting the main supply to the said separate sections simultaneously with the movement of the vehicle and cutting in resistance when required, substantially as set forth.

7. A distributer for use in a system of electric traction of the kind above described consisting of the combination of a main supply contact-arm connected with a source of supply, six shunt contact-arms connected with one another in pairs, three on each side of but insulated from main contact-arm, four contact-rings on which the said shunt-arms make contact, two of which are connected in shunt through a pair of magnets to the source of supply, and the other two connected respectively through two permanent stationary resistances to the return-rail, said magnets being excited by a shunt-current from main supply through the stationary resistance, a rocking switch permitting only one magnet to be excited at one time, the movable armatures of said magnets connected to opposite ends of a rocking bar and two pawls together with controlling-springs, two oppositely-cut ratchet-wheels permitting the main and shunt arms to be moved one contact at a time in either direction, and locking-catches for ratchets and means for operating same, a series of contacts arranged circumferentially, standards attached to same, a series of feeder-cables attached to standards, the whole inclosed in a casing having bosses and glands for main and feeder cables substantially as set forth.

8. A distributer for use in a system of electric traction of the kind above described consisting of the combination of a main supply contact-arm connected with a source of supply, two shunt contact-arms on each side of but insulated from the main contact-arm, two contact-rings on which the said shunt-arms make contact, one of which is connected in shunt through a magnet to the source of supply and the other connected through a permanent stationary resistance to the return-rail, said magnet being excited by a shunt-current from main supply through the stationary resistance, the movable armature of said magnet being connected to end of rocking bar and pawl together with controlling-springs, two oppositely-cut ratchet-wheels permitting the main and shunt arms to be moved one contact only at a time in one direction only, and locking-catch for ratchet and means for operating same, a series of contacts arranged circumferentially, standards attached to same, a series of feeder-cables attached to standards, the whole inclosed in a casing having bosses and glands for main and feeder cables substantially as set forth.

9. In a system of electric traction, the combination of an electrically-propelled vehicle having one or more main collectors making contact successively with a series of surface plates or rails, a shunt-brush on the vehicle directly in advance of the main collectors making contact successively with the said series of surface plates or rails and a resistance in the vehicle directly connected to the return-rail and the shunt-brush whereby a shunt-current can flow directly between the main-supply conductor and the return-rail, through the resistance and the magnets of the various distributers in circuit and so actuate said magnets, substantially as set forth.

10. In a system of electric traction in which the rails form a return-circuit and the electrically-propelled vehicle on the track has collectors attached, which pick up current from a series of surface plates or rails a certain number of which form a block, and in addition has a shunt-collector and resistance carried on the car for the purpose of operating vehicles passing to a branch line the combination of two reversing-distributers each consisting of a rotary main supply contact-arm two contact-arms one on each side of said arm but insulated therefrom, two contact-rings with which the side arms have connection, two magnets, a rocking bar, two springs and pawls, controlling-springs two oppositely-toothed ratchet-wheels, contact-feeders cable and connections substantially as described with a third distributer consisting of a rotary main supply-arm, three side contact-arms, two of which are arranged at the side of the main supply contact-arm and making contact with two rings and the third arm adjoining one of these side contact-arms, and insulated from them and the main supply-arm, one end of said third arm making contact with a third contact-ring and the other end making contact with an additional small contact, three magnets, two being arranged same as before described, the third making connection between the additional side contact and the main supply-conductor, a rocking arm, two springs and pawls, controlling-springs, oppositely-toothed ratchet-wheels, contacts, feeders, cables and connections, substantially as described the whole working as and for the purpose above set forth.

11. In a system of electric traction in which the rails form a return-circuit and the electrically-propelled vehicle on the track has collectors attached, which pick up current from a series of surface plates or rails a certain number of which form a block and in addition has a shunt-collector and resistance carried on the car and also has a reversible shunt-collector which can be connected to either of two resistances carried on car the combination of a reversing-distributer consisting of a rotary main supply contact-arm two contact-arms one on each side of said arm but insulated therefrom, two contact-rings with which the side arms have connection, two magnets, a rocking bar, two springs and pawls, controlling-springs, two oppositely-toothed ratchet-wheels, contact-feeders cables and connections substantially as described, with a reversing-switch carried on vehicle consisting of contact-arms one more than there are collectors (including main and shunt) on the car the outside ones being each connected to return-rail through one of the resistances carried in car and the same number of contact-pieces as there are collectors these being connected to same as and for the purposes set forth.

12. In a system of electric traction in which the rails form a return-circuit and the electrically-propelled vehicle on the track has collectors attached, which pick up current from a series of surface plates or rails a certain number of which form a block and in addition has a shunt-collector and resistance carried on the car Z for the purpose of supplying current to the motor of any car which has run into any section of a block then occupied but just cleared, the combination of a reversing-distributer consisting of a rotary main supply contact-arm, two contact-arms one on each side of said arm but insulated therefrom, two contact-rings with which the side arms have connection, two magnets, a rocking bar, two springs and pawls, controlling-springs, two oppositely-toothed ratchet-wheels, contact-feeders cables and connections substantially as described with a separate switch provided with means for operating it by hand consisting of a series of circularly-arranged contacts connected to a series of successive sections, commencing at the first or last section of a block, an extra insulated contact a rotating contact-arm connected to the return-rail through a resistance as and for the purpose set forth.

13. In a system of electric traction in which the rails form a return-circuit and the electrically-propelled vehicle on the track has collectors attached, which pick up current from a series of surface plates or rails, a certain number of which form a block and in addition has a shunt collector and resistance carried on the car for the purpose of electrically disconnecting the exposed section immediately in the rear of the section supplying current to a car the combination of a reversing-distributer consisting of a rotary main supply contact-arm, two contact-arms one on each side of said arm but insulated therefrom, two contact-rings with which the side arms have connection, two magnets, a rocking bar, two springs and pawls, controlling-springs, two oppositely-toothed ratchet-wheels, contact-feeders cables and connections substantially as described with an automatic switch actuated by the movement of the rotary main supply contact-arm consisting of a rocking arm held flexibly in a straight position by means of the clips and springs controlling its position, a contact at each end of the rocking arm being connected to that contact-arm (on each side of the rotary main supply contact-arm) directly opposite same, two separately-insulated contact-pieces each connected to one of the distributer-magnets as and for the purpose set forth.

In witness whereof I have hereunto set my hand in the presence of two witnesses.

PERCIVAL J. PRINGLE.

Witnesses:
HENRY A. PRYOR,
ALFRED B. CAMPBELL.